US012240776B2

(12) United States Patent
Yu et al.

(10) Patent No.: US 12,240,776 B2
(45) Date of Patent: Mar. 4, 2025

(54) INTEGRATED BORON REMOVAL AND FLOCCULATION PROCESS FOR TREATING FRACTURING WASTEWATER

(71) Applicants: XI'AN SHIYOU UNIVERSITY, Shaanxi (CN); CHINA NATIONAL PETROLEUM CORPORATION SAFETY AND ENVIRONMENTAL TECHNOLOGY RESEARCH INSTITUTE CO., LTD., Beijing (CN)

(72) Inventors: Tao Yu, Shaanxi (CN); Chengtun Qu, Shaanxi (CN); Jinling Li, Shaanxi (CN); Bo Yang, Shaanxi (CN); Xiaofei Zhang, Shaanxi (CN); Zhen Luo, Shaanxi (CN); Rongrong He, Shaanxi (CN)

(73) Assignees: XI'AN SHIYOU UNIVERSITY, Shaanxi (CN); CHINA NATIONAL PETROLEUM CORPORATION SAFETY AND ENVIRONMENTAL RESEARCH INSTITUTE CO., LTD, Beijing (CN)

( * ) Notice: Subject to any disclaimer, the term of this patent is extended or adjusted under 35 U.S.C. 154(b) by 413 days.

(21) Appl. No.: 17/616,443

(22) PCT Filed: Aug. 5, 2020

(86) PCT No.: PCT/CN2020/107113
§ 371 (c)(1),
(2) Date: Dec. 3, 2021

(87) PCT Pub. No.: WO2021/027654
PCT Pub. Date: Feb. 18, 2021

(65) Prior Publication Data
US 2022/0227650 A1    Jul. 21, 2022

(30) Foreign Application Priority Data

Aug. 14, 2019 (CN) .......................... 201910747901.X

(51) Int. Cl.
| | |
|---|---|
| *C02F 9/00* | (2023.01) |
| *C02F 1/00* | (2023.01) |
| *C02F 1/52* | (2023.01) |
| *C02F 1/66* | (2023.01) |
| *C02F 1/72* | (2023.01) |
| *C02F 1/76* | (2023.01) |
| *C02F 101/10* | (2006.01) |
| *C02F 101/30* | (2006.01) |
| *C02F 103/10* | (2006.01) |
| *C02F 103/36* | (2006.01) |

(52) U.S. Cl.
CPC .............. *C02F 9/00* (2013.01); *C02F 1/004* (2013.01); *C02F 1/5236* (2013.01); *C02F 1/66* (2013.01); *C02F 1/722* (2013.01); *C02F 1/76* (2013.01); *C02F 2101/108* (2013.01); *C02F 2101/30* (2013.01); *C02F 2103/10* (2013.01); *C02F 2103/365* (2013.01); *C02F 2209/06* (2013.01); *C02F 2209/44* (2013.01); *C02F 2305/023* (2013.01)

(58) Field of Classification Search
CPC .......... C02F 1/004; C02F 1/5236; C02F 1/66; C02F 1/722; C02F 1/76; C02F 2101/108; C02F 2101/30; C02F 2103/10; C02F 2103/365; C02F 2209/06; C02F 2209/44; C02F 2305/023; C02F 9/00
See application file for complete search history.

(56) References Cited

U.S. PATENT DOCUMENTS

2009/0057237 A1* 3/2009 Slabaugh .............. E21B 21/068
                                                              210/202

FOREIGN PATENT DOCUMENTS

CN         106673268 A    *  5/2017

\* cited by examiner

*Primary Examiner* — Dirk R Bass

(57) ABSTRACT

An integrated boron removal and flocculation process for treating fracturing wastewater is disclosed. The process comprises: adjusting the pH of the fracturing flowback liquid to be treated to become alkaline and adding thereto an oxidant to carry out a reaction for a certain time period, so that the state of the boron present in the liquid is changed; and then adding a barium salt to the resulting reaction mixture to carry out a further reaction between the barium salt and the boron in the changed state to produce a precipitate. The stability of the flowback liquid is deteriorated by the addition of the oxidant. Suspended solids in the flowback liquid can be removed through adsorption, wrapping, and then settling by the action of the precipitate (a barium salt). The process integrates boron removal and flocculation and enables a boron removal rate of 80% or greater. An integrated boron removal and flocculation process for treating fracturing wastewater is disclosed. The process comprises: adjusting the pH of the fracturing flowback liquid to be treated to become alkaline and adding thereto an oxidant to carry out a reaction for a certain time period, so that the state of the boron present in the liquid is changed; and then adding a barium salt to the resulting reaction mixture to carry out a further reaction between the barium salt and the boron in the changed state to produce a precipitate. The stability of the flowback liquid is deteriorated by the addition of the oxidant. Suspended solids in the flowback liquid can be removed through adsorption, wrapping, and then settling by the action of the precipitate (a barium salt). The process integrates boron removal and flocculation and enables a boron removal rate of 80% or greater.

5 Claims, No Drawings

INTEGRATED BORON REMOVAL AND FLOCCULATION PROCESS FOR TREATING FRACTURING WASTEWATER

CROSS-REFERENCE TO RELATED APPLICATION

This application is a national phase entry of International Application No.: PCT/CN2020/107113, filed on Aug. 5, 2020 and titled "METHOD FOR CARRYING OUT BORON-REMOVAL AND FLOCCULATION INTEGRATED TREATMENT ON FRACTURING WASTE LIQUID," which claims priority to and the benefit of Chinese Patent Application No.: 201910747901.X, filed on Aug. 14, 2019 and titled "一种除硼—絮凝—体化处理压裂废液的方法." The contents of the above-identified Applications are relied upon and incorporated herein by reference in their entirety.

TECHNICAL FIELD

The present disclosure is related to the field of oil or gas field wastewater treatment, and in particular to an integrated boron removal and flocculation process for treating fracturing flowback liquid.

BACKGROUND

Fracturing fluid is essential for hydraulic fracturing. Its preparation requires various additives, including a thickening agent, a cross-linking agent, a sterilizing agent, a high temperature stabilizer and the like, so as to enable the prepared fracturing fluid to have good properties and thus satisfy the requirements of the fracturing operation. At the end of the fracturing operation, 30 to 60% of the fracturing fluid is flowed back to the ground. A fracturing flowback fluid is thus formed. The flowback fluid contains the various additives used in the preparation of the fracturing fluid and hazardous substances including formation water and crude oil, and is considered one of the industrial wastewater which is difficult to purify. Currently, the fracturing flowback fluid is typically and advantageously reused after treatment for the preparation of the fracturing fluid, thereby realizing recycling of water in the fracturing flowback fluid.

Water quality parameters, including oil content and suspended solids content, of the fracturing flowback fluid having been subjected to oxidation, flocculation, settling and the like can substantially satisfy the requirements for reuse. However, during the subsequent preparation of the fracturing fluid, the cross-linking agent containing boron remaining in the fracturing flowback fluid would be previously cross-linked with polymers due to addition of an alkaline additive and thus an increase in pH value. This may cause problems such as blockage of process pipelines and a difficulty in determining the degree of cross-linking, thereby negatively affect the reuse of the flowback fluid.

CN 1507417 A describes a water processing method, comprising separating boron-containing water in a reverse osmosis membrane module to provide a permeated water; subjecting a portion of the obtained permeated water to boron removal using an adsorbent; and mixing the portion of the permeated water subjected to the boron removal with the other portion not subjected to the boron removal in a certain ratio to provide a mixed water having a low boron content. This method is suitable to process water having a boron concentration of equal to or less than 10 mg/L, and can enable the boron concentration to be lowered to 0.05 mg/L or less.

CN 103298748 A describes a process for treating seawater containing boron by means of using expanded clays with a particle size in the range of 0.2 to 10 mm and a porosity of higher than 40%. In the event that the seawater to be treated is at a pH of 8.2 and has a boron concentration of 4 to 5 mg/L, the process can selectively remove the boron contained therein.

CN 201610086174 describes a process for substantially removing boron in a lithium chloride solution, comprising three steps of adsorption, elution, and desorption. In particular, the lithium chloride solution containing boron is fed into an adsorption column packed with boron-removing resin so that the boron ions can be bound to the resin to form a complex. Thus, a high-purity lithium chloride solution can be obtained. For the lithium chloride solution having a boron concentration of 5 to 8000 mg/L, the boron concentration can be substantially lowered to 1 mg/L or less by using the process with a boron removal rate of 99.5% or more.

CN 102703703 B describes a continuous ion exchange device and method for removing boron from salt-lake brine of magnesium chloride, the device comprising a plurality of resin columns packed with a resin, feed manifolds configured to be connected to tops of the resin columns, and discharge manifolds configured to be connected to bottoms of the resin columns. All of the resin columns are sequentially connected in series via pipes to form five sets of resin columns, each set configured to sequentially and cyclically perform adsorption (to remove boron), elution, desorption, back-washing, and replacement (with the final brine) processes by means of control valves arranged on feed branch pipes and discharge branch pipes (i.e., these control valves enable the individual processes to proceed in each set in turn).

CN 105198054 A describes a process for removing boron from a body of water, comprising: adding magnesium oxide into the body of water containing boron followed by stirring under heating to initially remove the boron; and filtering the resulting solution to obtain a filter, into which an oxidant is added followed by stirring under heating to substantially remove the boron. The magnesium oxide as a raw material in the process is cheap and easily available. The boron removal process described in CN 105198054 A causes no loss of the magnesium content in the body of water. The body of water to be treated can be a body of water having a high boron content, such as subsurface brine, salt-lake brine, industrial wastewater, and seawater, and the boron content can be reduced to 5 mg/L or less by using the process. The process is simple and low cost.

CN 109485185 A describes a pulse electrochemical process and device for treating oil field wastewater. The process comprises aerating the oil field wastewater to be treated; performing electrochemical treatment for the aerated oil field wastewater with a pulse power source at a predetermined current density; subjecting the oil field wastewater after the electrochemical treatment to pH adjustment, followed by addition of auxiliary agents to carry out coagulation and precipitation treatments, thereby completing the electro-flocculation treatment for the oil field wastewater. The device comprises a pH-regulating tank, an electrochemical reaction system, and a coagulation tank.

CN 103043831 relates to the field of wastewater treatment, in particular treatment of wastewater generated from continental shale gas production, and especially to a process for treating wastewater from continental shale gas well fracturing. The process is characterized by five steps, performed sequentially, of pH adjustment, oxidation (thus reduction in viscosity), flocculation and settling, solid-liquid separation and then adsorption and filtration. The wastewater after treatment using the process can be recycled to the fracturing liquid preparation or to be injected back into stratum, which saves water and is beneficial to the environment. In particular, the process may be performed as follows: adjusting the pH of the wastewater to pH 5.5; adding 0.15% hydrogen peroxide thereto, followed by stirring for 15 minutes to carry out a reaction; adjusting the pH of the resulting solution to pH 8.0, followed by addition of 50 mg/L polyaluminum chloride and 2 mg/L anionic polyacrylamide; and allowing the solution to stand still for 10 minutes before filtration.

CN 104743713 B describes a device for treating wastewater from oil field well drilling and measure well operation, which can prevent any components of the wastewater from falling onto the ground and comprises a pressure reduction and sand removal unit, a coagulation and settling unit for removing mud, a water purification unit, a sludge solidification unit, a gas feeding unit, and a drug feeding unit. When in use, the high-pressure fracturing flowback liquid from oil field well drilling and measure well operation is fed into the pressure reduction and sand removal unit to subject to pressure reduction and oil-sand-liquid separation. The separated liquid is fed into the coagulation and settling tank via a multi-purpose pump for water-mud separation. The separated effluent is pumped into a three-stage treatment tank of the water purification unit via a pressure pump for purification treatment. Oil, sand, and water produced by the purification treatment are each recycled. The concentrated sludge is subjected to solidification treatment by the sludge solidification unit to form clods, which are then transported to biosafety disposal sites. During this whole treatment process, none of the oil, mud, and water falls to the ground. The device is reasonably designed, and allows the treatment process using it to provide high resource utilization and be environmentally friendly.

CN 106630309 A describes a system for treating downhole operation wastewater. The system comprises a reactor, where the wastewater is subjected to oxidation so that high-molecular organic compounds therein are degraded and the content of dichromates is thus reduced; and a reverse osmosis unit, where the wastewater having been subjected to the oxidation process is subjected to reverse osmosis to produce a concentrated solution and permeate which can be discharged directly. With the system, impurities present in the wastewater can be removed therefrom through the oxidation and reverse osmosis processes, so that the wastewater can be discharged as treated water capable of meeting the emission standard and pollution of the soil by the wastewater can thus be prevented.

From the above, it is seen that no removal of boron is described in the oil fracturing wastewater treatment and the oil field wastewater treatment. Few treatment processes for the oil fracturing wastewater are disclosed involving removal of boron, and in these processes, the removal of boron is carried out separately from flocculation, which may cause problems such as long process flow and high cost. In these processes, the removal of boron proceeds mostly by combining adsorption and reverse osmosis.

SUMMARY

An objective of the present disclosure is to provide an integrated boron removal and flocculation process for treating fracturing wastewater.

Accordingly, the objective of the present disclosure is realized by an integrated boron removal and flocculation process for treating fracturing wastewater or fracturing flowback liquid, comprising steps of: adjusting a pH level of the fracturing flowback liquid to be treated with an alkali to a range of 8.5 to 10.0; adding an oxidant to the flowback liquid after pH adjustment to carry out a reaction at room temperature for 30 to 120 minutes; adding a barium salt to the reaction mixture resulting from the reaction to carry out a further reaction at room temperature for 30 to 120 minutes; and allowing the reaction mixture resulting from the preceding step to stand still and settle before filtration via a filtration unit.

The alkali may be a 10 to 30 wt. % aqueous sodium hydroxide or potassium hydroxide solution.

The barium salt may be barium chloride or barium nitrate. The ratio of the barium salt used to the fracturing flowback liquid may be 100-150 mg:1 L.

The oxidant may be a 25 to 30 wt. % aqueous hydrogen peroxide solution or a 12 to 15 wt. % aqueous sodium hypochlorite solution. The volume of the oxidant used may be 0.15 to 0.5 vol. % of that of the fracturing flowback liquid to be treated.

The fracturing flowback liquid to be treated may have a boron content of 100 to 200 mg/L. The fracturing flowback liquid to be treated may be a guar gum base liquid or a guar gum-polymer base liquid, wherein the polymer in the guar gum-polymer base liquid may be partially crosslinked polyacrylamide with a viscosity-average molecular weight of 12,000,000 to 18,000,000; and the ratio of the guar gum to the polymer may be 3:1 to 5:1 by weight.

The stand still and settling step may last for 20 to 40 minutes.

The filtration unit may be formed by two filters, in series, selected from the group consisting of walnut shell, quartz sand, and modified fibrous ball filters.

In accordance with the above-described embodiments of the present disclosure, the state of the boron in the fracturing flowback liquid can be changed by adjusting the pH thereof to become alkaline and then adding thereto an oxidant to carry out a reaction for a certain time period, and the boron in the changed state can then be reacted with the barium salt added thereafter to produce a precipitate. The stability of the flowback liquid can be deteriorated by the addition of the oxidant. Suspended solids in the flowback liquid can be removed through adsorption, wrapping, and then settling by the action of the precipitate formed (a barium salt). Compared with the prior art, the process of the present disclosure has several advantages.

With the embodiments of the present disclosure, the removal of boron and flocculation occur simultaneously instead of separately, realizing integration thereof and overcoming problems in the existing processes for preparing the fracturing liquid from the fracturing flowback liquid, for example, they requires a long process line and a large number of devices;

Impurities such as suspended solids and oil present in the fracturing flowback liquid can be removed through adsorption, wrapping, and then settling by the action of the precipitate produced from the boron removal, so no additional inorganic flocculant is needed and the amount of sludge produced is reduced. The boron removal rate can reach 80% or greater. The contents of the suspended solids and oil present in the fracturing flowback liquid after filtration each can be lowered to less than 5.0 mg/L.

DETAILED DESCRIPTION

The embodiments of the present disclosure will be further described in detail with reference to examples, but the disclosure is not limited to these examples.

Example 1

1000 mL of guar gum base fracturing flowback liquid (water base liquid) was taken and the pH was adjusted to 10 using 30 wt. % aqueous sodium hydroxide solution. 2 mL of 30 wt. % aqueous hydrogen peroxide solution was then added to the liquid to carry out a reaction at room temperature for 120 minutes. Thereafter, 150 mg of barium chloride was added to carry out a further reaction at room temperature for 30 minutes. The resulting reaction mixture was allowed to stand still and settle for 30 minutes, and then was filtered via one walnut shell filter and one quartz sand filter arranged in series. It was found that the boron content in the liquid was reduced from 154 mg/L to 28 mg/L with a boron removal rate of 80%, and the suspended solids and oil contents were reduced from 85 mg/L and 60 mg/L to 5.0 mg/L and 3.0 mg/L, respectively.

Example 2

1000 mL of guar gum-polymer (polyacrylamide with a viscosity-average molecular weight of 12,000,000; mass ratio of the guar gum to the polymer=3:1) base fracturing flowback liquid (water base liquid) was taken and the pH was adjusted to 9.5 using 20 wt. % aqueous sodium hydroxide solution. 5 mL of 12 wt. % aqueous sodium hypochlorite solution was then added to the liquid to carry out a reaction at room temperature for 90 minutes. Thereafter, 120 mg of barium nitrate was added to carry out a further reaction at room temperature for 40 minutes. The resulting reaction mixture was allowed to stand still and settle for 20 minutes, and then was filtered via one quartz sand filter and one modified fibrous ball filter arranged in series. It was found that the boron content in the liquid was reduced from 143 mg/L to 14.1 mg/L with a boron removal rate of 90%, and the suspended solids and oil contents were reduced from 106 mg/L and 80 mg/L to 4.0 mg/L and 2.0 mg/L, respectively.

Example 3

1000 mL of guar gum base fracturing flowback liquid (water base liquid) was taken and the pH was adjusted to 8.5 using 10 wt. % aqueous sodium hydroxide solution. 4 mL of 25 wt. % aqueous hydrogen peroxide solution was then added to the liquid to carry out a reaction at room temperature for 90 minutes. Thereafter, 100 mg of barium chloride was added to carry out a further reaction at room temperature for 100 minutes. The resulting reaction mixture was allowed to stand still and settle for 30 minutes, and then was filtered via one walnut shell filter and one modified fibrous ball filter arranged in series. It was found that the boron content in the liquid was reduced from 103 mg/L to 9.7 mg/L with a boron removal rate of 90%, and the suspended solids and oil contents were reduced from 110 mg/L and 108 mg/L to 6.0 mg/L and 4.0 mg/L, respectively.

Example 4

1000 mL of guar gum-polymer (polyacrylamide with a viscosity-average molecular weight of 18,000,000; mass ratio of the guar gum to the polymer=5:1) base fracturing flowback liquid (water base liquid) was taken and the pH was adjusted to 10 using 30 wt. % aqueous potassium hydroxide solution. 3 mL of 15 wt. % aqueous sodium hypochlorite solution was then added to the liquid to carry out a reaction at room temperature for 30 minutes. Thereafter, 130 mg of barium nitrate was added to carry out a further reaction at room temperature for 90 minutes. The resulting reaction mixture was allowed to stand still and settle for 40 minutes, and then was filtered via one walnut shell filter and one modified fibrous ball filter arranged in series. It was found that the boron content in the liquid was reduced from 123 mg/L to 11.7 mg/L with a boron removal rate of 90% or greater, and the suspended solids and oil contents were reduced from 97 mg/L, and 68 mg/L, to 5.0 mg/L, and 2.0 mg/L, respectively.

The above are only preferred embodiments of the present disclosure. It will be understood that various modifications and improvements may be made without departing from the scope and principle of the disclosure.

What is claimed is:

1. An integrated boron removal and flocculation process for treating fracturing wastewater, comprising steps of:
   adjusting a pH level of the fracturing wastewater to be treated with an alkali to a range of 8.5 to 10.0, wherein the fracturing wastewater to be treated has a boron content of 100 to 200 mg/L;
   adding an oxidant to the wastewater after pH adjustment to carry out a reaction at room temperature for 30 to 120 minutes, wherein the oxidant is a 25 to 30 wt. % aqueous hydrogen peroxide solution or a 12 to 15 wt. % aqueous sodium hypochlorite solution and the volume of the oxidant used is 0.15 to 0.5% of the fracturing wastewater to be treated;
   adding a barium salt to the reaction mixture resulting from the reaction to carry out a further reaction at room temperature for 30 to 120 minutes, wherein the ratio of the barium salt used to the fracturing wastewater to be treated is 100-150 mg:1 L; and
   allowing the reaction mixture resulting from the preceding step to stand still and settle for 20 to 40 minutes before filtration via a filtration unit.

2. The process according to claim 1, wherein the alkali is a 10 to 30 wt. % aqueous sodium hydroxide or potassium hydroxide solution.

3. The process according to claim 1, wherein the barium salt is barium chloride or barium nitrate.

4. The process according to claim 1, wherein the fracturing wastewater to be treated is a guar gum base liquid or a guar gum-polymer base liquid, wherein the polymer is partially crosslinked polyacrylamide with a viscosity-average molecular weight of 12,000,000 to 18,000,000; and the ratio of the guar gum to the polymer is 3:1 to 5:1 by weight.

5. The process according to claim 1, wherein the filtration unit is formed by two filters, in series, selected from the group consisting of walnut shell, quartz sand, and modified fibrous ball filters.

* * * * *